(12) United States Patent
Imajo

(10) Patent No.: US 8,276,968 B2
(45) Date of Patent: Oct. 2, 2012

(54) LOCKING DEVICE

(75) Inventor: Taku Imajo, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 317 days.

(21) Appl. No.: 12/595,912

(22) PCT Filed: Apr. 7, 2008

(86) PCT No.: PCT/JP2008/056865
§ 371 (c)(1),
(2), (4) Date: Dec. 2, 2009

(87) PCT Pub. No.: WO2008/132973
PCT Pub. Date: Nov. 6, 2008

(65) Prior Publication Data
US 2010/0133412 A1    Jun. 3, 2010

(30) Foreign Application Priority Data
Apr. 25, 2007 (JP) .................................. 2007-115400

(51) Int. Cl.
*B60N 2/02* (2006.01)
(52) U.S. Cl. .................................. 296/65.03; 248/503.1
(58) Field of Classification Search ............... 248/503.1, 248/503, 617, 205.1, 220.21, 220.22, 222.11, 248/222.12, 222.52, 225.11, 225.21, 292.12; 296/65.03, 65.01, 65.02, 65.05; 292/216; 297/336
See application file for complete search history.

(56) References Cited

U.S. PATENT DOCUMENTS

| | | | | | |
|---|---|---|---|---|---|
| 6,123,379 | A * | 9/2000 | Yamada et al. | ............ | 296/65.03 |
| 6,666,512 | B1 * | 12/2003 | Timon | .......................... | 297/335 |
| 7,431,371 | B2 * | 10/2008 | Miller et al. | ................ | 296/65.03 |
| 7,455,336 | B2 * | 11/2008 | Baumchen et al. | ........... | 292/216 |
| 7,762,605 | B2 * | 7/2010 | Otsuka et al. | ................ | 296/65.03 |
| 8,029,030 | B2 * | 10/2011 | Shimura et al. | ................ | 292/216 |
| 2009/0056393 | A1 | 3/2009 | Otsuka | | |
| 2009/0224586 | A1 | 9/2009 | Otsuka et al. | | |

FOREIGN PATENT DOCUMENTS

JP    2002-339624    11/2002
(Continued)

OTHER PUBLICATIONS

English language Abstract of JP 2004-278234, Oct. 7, 2004.
English language Abstract of JP 2003-113687, Apr. 18, 2003.
English language Abstract of JP 2003-293638, Oct. 15, 2003.
English language Abstract of JP 2006-144513, Jun. 8, 2006.

(Continued)

*Primary Examiner* — Amy Sterling
*Assistant Examiner* — Todd M Epps
(74) *Attorney, Agent, or Firm* — Greenblum & Bernstein, P.L.C.

(57) ABSTRACT

A locking device includes a locking mechanism and a striker. The locking mechanism includes a lock base, a hook and a pawl. The lock base has a recess that is capable of receiving the striker. The hook is capable of forming a locked condition in which the striker is held between the hook and the recess of the lock base or an unlocked condition in which the hook is spaced away from the striker. The pawl is capable of rotating to a position in which the pawl can engage an engagement surface of the hook and maintaining the hook in the locked condition. The engagement surface of the hook is provided with a resin coating that constitutes an elastically reactive portion. The elastically reactive portion is shaped to produce an elastically reactive force between the engagement surface of the hook and the pawl in the locked condition.

9 Claims, 5 Drawing Sheets

FOREIGN PATENT DOCUMENTS

| | | |
|---|---|---|
| JP | 2003-113687 | 4/2003 |
| JP | 2003-184393 | 7/2003 |
| JP | 2003-293638 | 10/2003 |
| JP | 2004-278234 | 10/2004 |
| JP | 2006-144513 | 6/2006 |
| WO | 2006/095517 | 9/2006 |

OTHER PUBLICATIONS

China Office action, dated Feb. 20, 2012 along with an english translation thereof.

Japan Office action, dated Apr. 10, 2012 along with an english translation thereof.

* cited by examiner

A-A Cross Section

LOCKING DEVICE

TECHNICAL FIELD

The present invention mainly relates to a locking device that is capable of connecting a vehicle seat to a vehicle body side or disconnecting the same therefrom.

BACKGROUND ART

In a locking device of this type, a locking mechanism is provided to a seat side and a striker is provided to a vehicle body side. The locking mechanism includes a lock base having a recess that is capable of receiving the striker. Further, the locking mechanism includes a hook and a pawl. The hook is rotatably supported on the lock base. The hook forms a locked condition in which the striker is held between the hook and the recess of the lock base or an unlocked condition in which the hook is spaced from the striker. The pawl, when rotated to a position in which the pawl engages the hook, can maintain the hook in the locked condition. When the locking device is applied with vibration, a noise can be generated by metal-to-metal contacting of the hook and the striker or the pawl in the locked condition.

A door locking device described in, for example, Japanese Laid-Open Patent Publication No. 2004-278234 is known as a technique to avoid noise generation. The door locking device includes a latch mechanism provided to a door side and a striker provided to a vehicle body side. The latch mechanism includes a latch that is capable of receiving the striker and engaging the same. The latch has a resin coating that is applied to a surface thereof. The resin coating has a contact portion to which the striker contacts. The contact portion is shaped to elastically produce a reaction force. Thus, the noise caused by contacting of the latch and the striker can be reduced.

If the technique to avoid noise generation described in Japanese Laid-Open Patent Publication No. 2004-278234 is applied to the locking mechanism described above, the noise produced between the hook and the pawl cannot be prevented.

Thus, there is a need in the art to eliminate a noise produced between a hook and a pawl in a locked condition of a locking mechanism.

Further need is to increase an engagement force between an engagement surface of a hook and a pawl.

Further need is to restrict noise generation caused by, for example, metal-to-metal contacting of a hook and a striker when a locking operation is performed.

SUMMARY OF THE INVENTION

A locking device includes a locking mechanism provided on one of two members to be engaged with each other, and a striker provided on the other of the two members. The locking mechanism comprises a lock base, a hook and a pawl. The lock base has a recess that is capable of receiving the striker. The hook is rotatably supported on the lock base via a shaft. The hook, when rotated, is capable of forming a locked condition in which the striker is held between the hook and the recess of the lock base or an unlocked condition in which the hook is spaced away from the striker. The pawl is rotatably supported on the lock base via a shaft. The pawl is capable of rotating to a position in which the pawl can engage an engagement surface of the hook and maintaining the hook in the locked condition. The engagement surface of the hook is provided with a resin coating that constitutes an elastically reactive portion. The elastically reactive portion is shaped to produce an elastically reactive force between the engagement surface of the hook and the pawl in the locked condition.

In this structure, the elastically reactive portion of the resin coating can prevent a noise generated between the engagement surface of the hook and the pawl in the locked condition.

Preferably, the engagement surface of the hook is inclined in such a direction in which the engagement surface is capable of catching the pawl in the locked condition.

According to this structure, an engagement force between the engagement surface of the hook and the pawl can be increased even though the elastically reactive portion of the resin coating is disposed on the engagement surface of the hook. Therefore, even if a large load to rotate the hook in the unlocking direction is generated in the locked condition, engagement between the engagement surface of the hook and the pawl can be prevented from being released, so that a locking strength of the locking mechanism can be increased.

More preferably, the elastically reactive portion of the resin coating includes a contact surface that is capable of contacting the pawl. The contact surface is shaped such that a central portion thereof can be most projected and that oppositely inclined oblique surfaces can be formed on both sides of the central portion.

Thus, the contact surface of the elastically reactive portion is shaped such that the oppositely inclined oblique surfaces can be formed on both sides of the most projected central portion thereof. Therefore, engagement performance between the contact surface of the elastically reactive portion and the pawl can be increased at the time of a locking operation. Further, an engagement force between the contact surface and the pawl can be increased, so that locking performance of the locking mechanism can be increased.

More preferably, the resin coating that constitutes the elastically reactive portion in the engagement surface of the hook covers a portion of the hook in which the striker is held between the same and the recess of the lock base.

According to this structure, noise generation caused by metal-to-metal contact between the hook and the striker can be prevented at the time of the locking operation of the locking mechanism.

DESCRIPTION OF REFERENCE SYMBOLS

Figure 1:
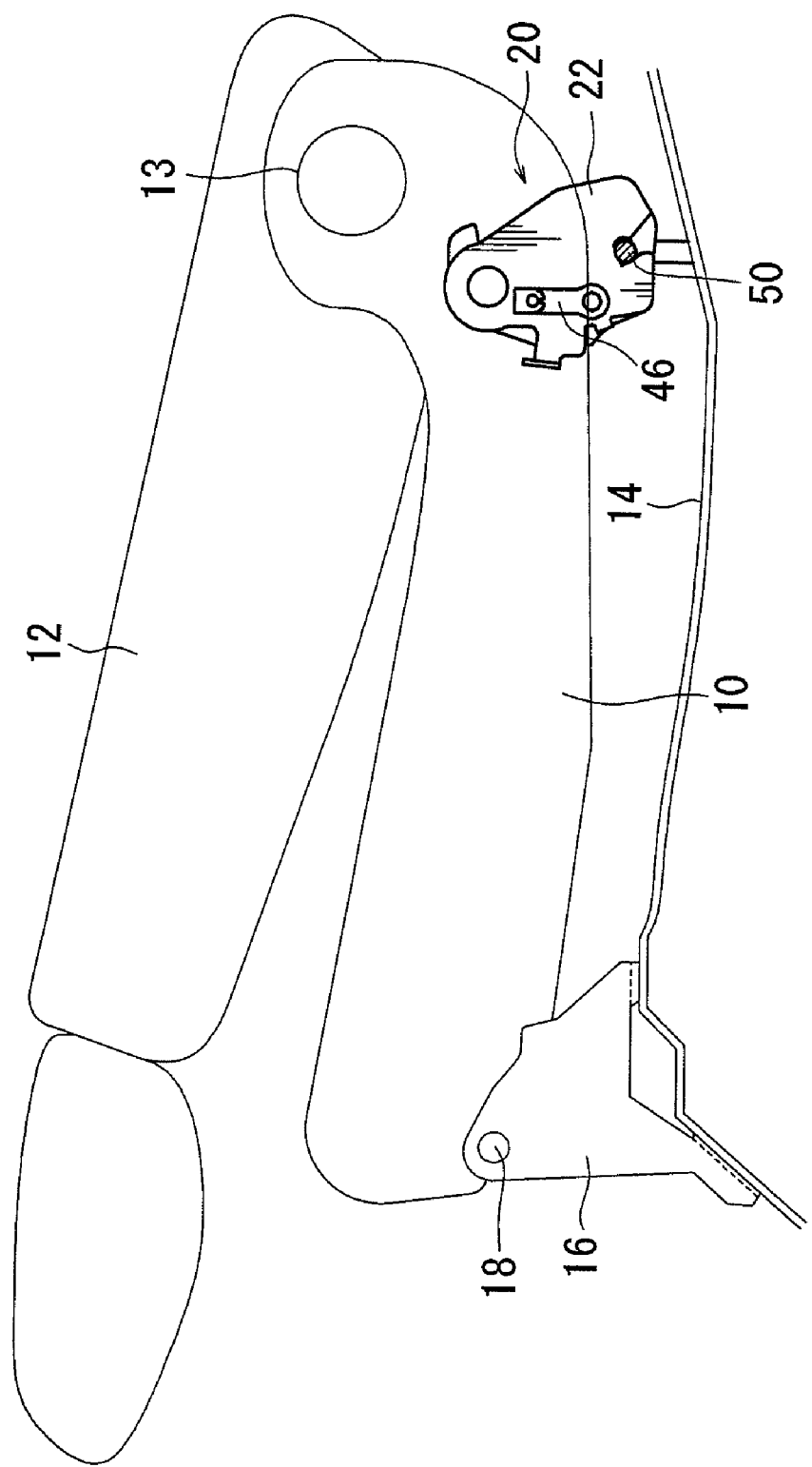
FIG. 1 is a side view of a retractable seat for a vehicle.

10 seat cushion (one of two members)
14 floor (the other of two members)
20 locking mechanism
22 lock base
23 recess
30 hook
32 engagement surface
34 resin coating
35 elastically reactive portion
40 pawl
50 striker

BEST MODE FOR CARRYING OUT THE INVENTION

In the following, a best mode for carrying out the present invention will be described with reference to the drawings.

A seat shown in FIG. 1 is, for example, a rear seat for three. In order to retract a seat of this type, as shown in FIG. 1, reclining devices 13 are first operated to fold a seat back 12 onto a seat cushion 10. At the same time, an unlocking operation is performed in order to unlock locking devices that connect a rear side lower portion of the seat cushion 10 and a floor 14 side. Thereafter, the seat cushion 10 is rotated using a front side end portion thereof as a fulcrum, so that the entire seat is raised against a back surface of a front seat (not shown).

As a structure for this purpose, the front side end portion of the seat cushion 10 is connected to hinge brackets 16 secured to the floor 14 via rotation shafts 18. Further, each of the locking devices connecting the rear side lower portion of the seat cushion 10 and the floor 14 side is generally constructed of a locking mechanism 20 and a striker 50. The locking mechanism 20 is positioned at the rear side lower portion (one of two members) of the seat cushion 10. The striker 50 is secured to the floor 14 (the other of the two members). Further, connection structures that are formed of the hinge brackets 16 and the rotation shafts 18 are respectively disposed on both sides of the seat cushion 10 as well as the locking devices.

Figure 2:
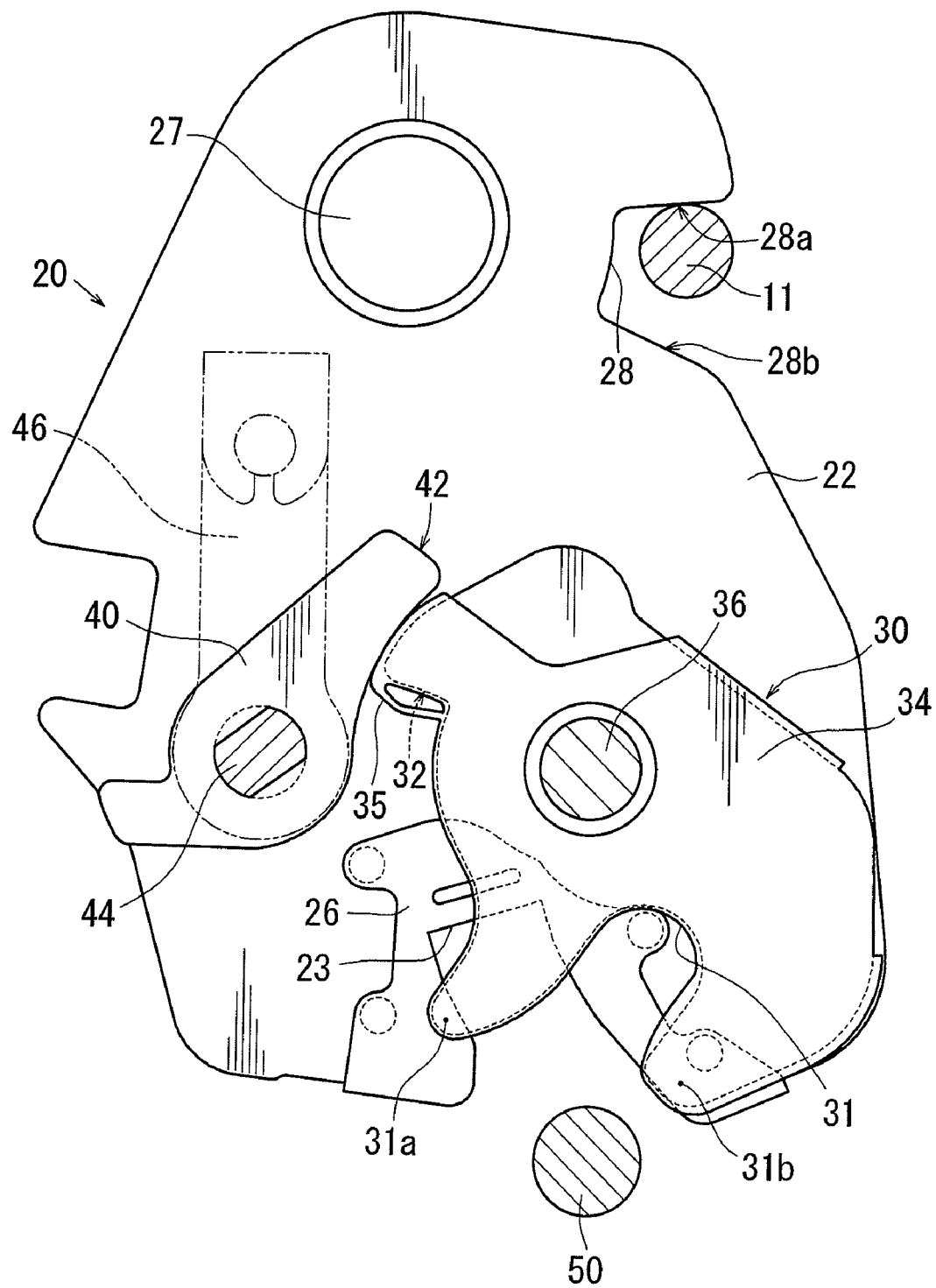
FIG. 2 is a structural view of a locking mechanism, which illustrates an unlocked condition thereof.
Figure 3:
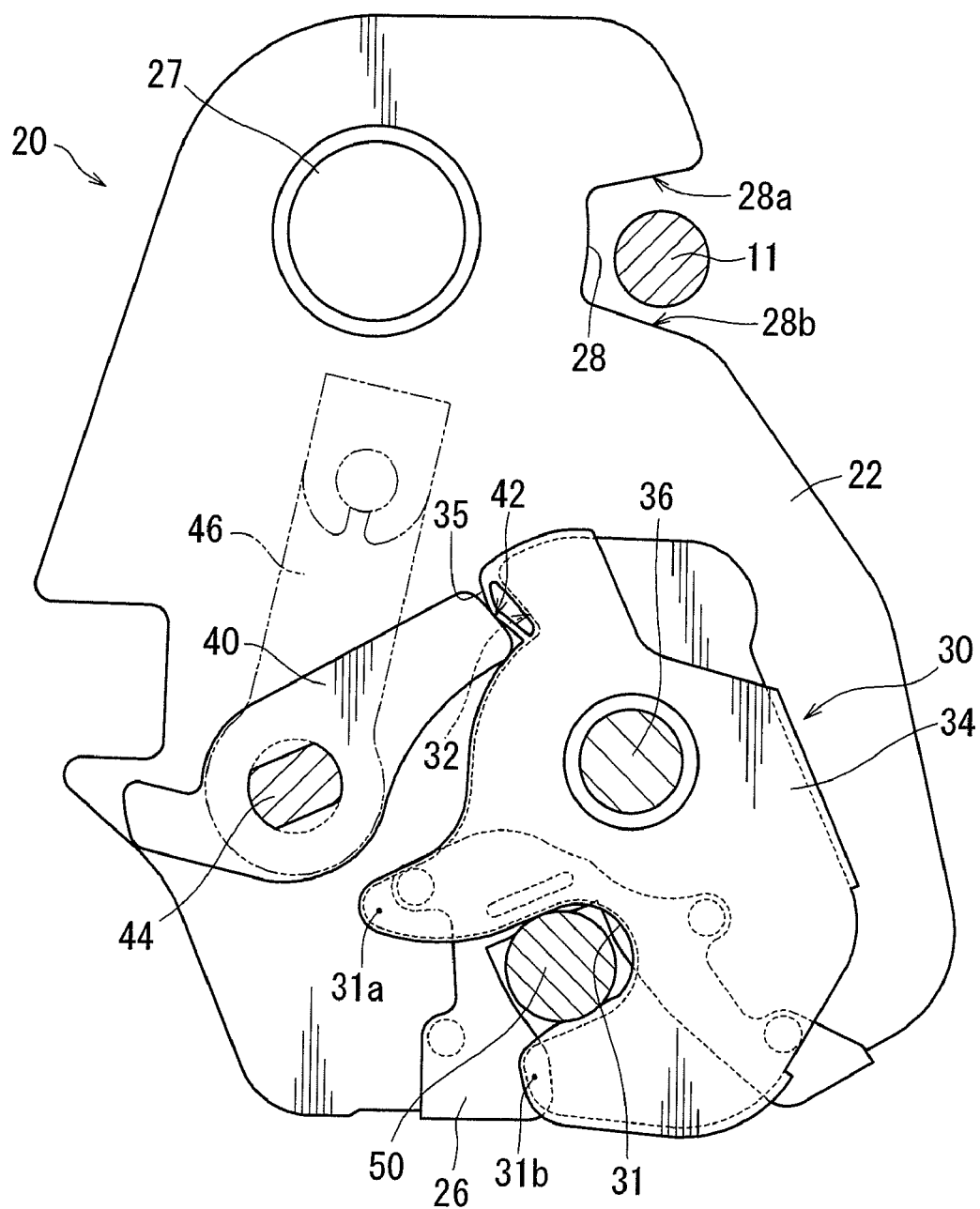
FIG. 3 is a structural view of the locking mechanism, which illustrates a locked condition thereof.

As shown in FIG. 2 and FIG. 3, the locking mechanism 20 essentially consists of lock bases 22, a hook 30, a pawl 40 and a release lever 46.

The lock bases 22 are arranged in pairs. The lock bases 22 are connected to each other at desired intervals, so that the remaining components except for the release lever 46 are positioned therebetween. The lock bases 22 are rotatably supported on the rear side lower portion of the seat cushion 10, i.e., one of the two members, via a support shaft 27.

Lower portions of the lock bases 22 are provided with recesses 23 that are downwardly opened. The recesses 23 are capable of receiving the striker 50 from open sides thereof. Whole peripheries of the recesses 23 are provided with resin coatings 26. The resin coatings 26 are intended to prevent noise generation caused by metal-to-metal contacting of the lock bases 22 and the striker 50 at the time of a locking operation, which will be described hereinafter.

The lock bases 22 respectively have U-shaped notches 28 each of which is formed in a portion laterally adjacent to the support shaft 27. Each of the notches 28 is formed by inwardly removing a periphery of the lock base 22. Conversely, a stopper pin 11 is secured to the seat cushion 10 side, i.e., one of the two members. The stopper pin 11 is arranged to be positioned within the notch 28. Thus, opposite stopper surfaces 28a and 28b of each of the notches 28 is capable of contacting the stopper pin 11, so as to limit rotation of the lock bases 22 about the support shaft 27. Further, the lock bases 22 are constantly biased clockwise in FIG. 2 and FIG. 3 by an elastic force of a spring (not shown). As a result, the lock bases 22 in an unlocked condition can be maintained in a condition in which the stopper surface 28a of each of the notches 28 contacts the stopper pin 11 (FIG. 2). That is, the lock bases 22 can rotate about an axis of the support shaft 27 such that the lower portions thereof having the recesses 23 can swing in an arc over a desired swing range. Further, in the unlocked condition, the lock bases 22 can be maintained in a rotational position shown in FIG. 2. Further, at this time, the recesses 23 is widely opened toward the striker 50.

Further, the elastic force of the spring that biases the lock bases 22 is set to a relatively small force that is capable of simply maintaining the lock bases 22 in the condition shown in FIG. 2.

The hook 30 is supported on the lock bases 22 so as to be rotatable about a hook shaft 36. The hook 30 has a hook recess 31 that is opened laterally. When the hook recess 31 engages the striker 50 that enters the recesses 23 of the lock bases 22, the striker 50 is held between the hook recess 31 and the recesses 23, so that a locked condition of the locking mechanism 20 is obtained (FIG. 3). Further, an engagement surface 32 capable of contacting the pawl 40 is formed in an outer periphery of the hook 30.

The pawl 40 and the release lever 46 are respectively connected to a pawl shaft 44 that is rotatably supported on the lock bases 22. The pawl 40 has an engagement end surface 42 that is capable of contacting and holding the engagement surface 32 of the hook 30. The release lever 46 is connected to a cable (not shown) that is capable of transmitting a manipulation force (a pulling force) for unlocking to the locking mechanism 20. When the release lever 46 is applied with the manipulation force for unlocking and rotates with the pawl shaft 44, the pawl 40 can be rotated via the pawl shaft 44. Further, a locking spring (not shown) constructed of a tension coil spring is disposed between the hook 30 and the release lever 46 (the pawl 40). Thus, the hook 30 is biased counterclockwise in FIG. 2 and FIG. 3, and at the same time, the release lever 46 is biased clockwise.

Figure 4:
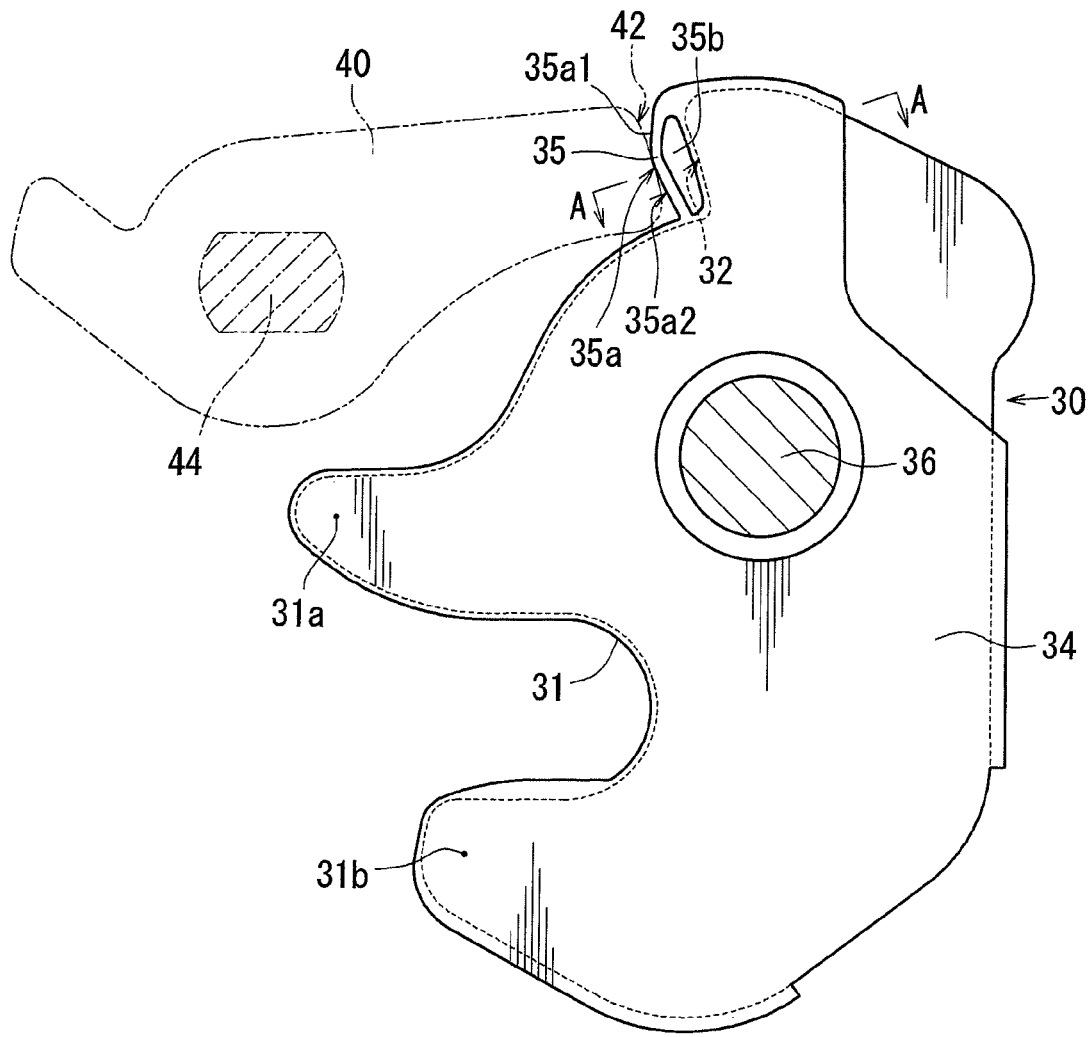
FIG. 4 is an enlarged structural view of a hook and a pawl.

As will be apparent from FIG. 4, the engagement surface 32 of the hook 30 is formed as an undercut inclined surface of which the protruding amount is reduced from the outer periphery of the hook 30 toward a rotation center thereof. Further, the hook 30 is provided with a resin coating 34 over a substantially entire surface thereof including the hook recess 31 and the engagement surface 32. A coating layer of the resin coating 34 covering an inner periphery of the hook recess 31 can prevent noise generation caused by metal-to-metal contact between the hook 30 and the striker 50 at the time of the locking operation.

Similarly, a portion of the resin coating 34 covering the engagement surface 32 is provided with an elastically reactive portion 35 that is capable of producing an elastically reactive force between the engagement surface 32 and the engagement end surface 42 of the pawl 40. That is, the engagement end surface 42 of the pawl 40 can hold the engagement surface 32 of the hook 30 via the elastically reactive portion 35.

The elastically reactive portion 35 includes a contact surface 35a that is capable of contacting the engagement end surface 42 of the pawl 40. The contact surface 35a is angled such that a central portion thereof can be projected the most. That is, the contact surface 35a has oppositely inclined oblique surfaces 35a1 and 35a2 that are formed in both sides of the central portion thereof (FIG. 4).

Figure 5:
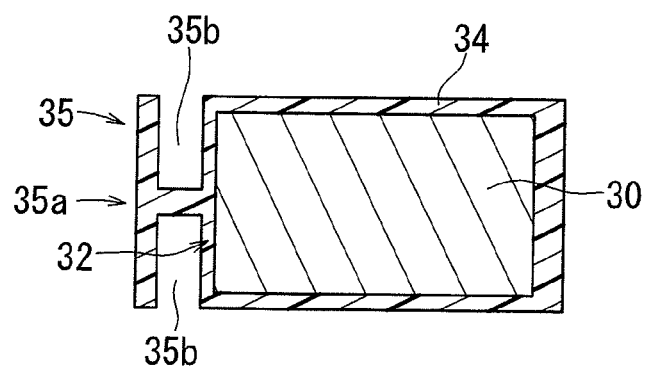
FIG. 5 is a cross-sectional view taken along line A-A in FIG. 4.

Further, because the contact surface 35a of the elastically reactive portion 35 is angled, the elastically reactive portion 35 can be easily deformed when the contact surface 35a contacts the engagement end surface 42 of the pawl 40. In addition, recessed portions 35b are respectively formed in both sides of the elastically reactive portion 35 such that only a rib-shaped thinned portion remains between the recessed portions 35b (FIG. 5). According to this structure, the elastically reactive portion 35 can be further easily deformed, so as to prevent a noise generated between the hook 30 and the pawl 40 due to the reactive force produced by deformation of the elastically reactive portion 35.

Next, a function of the locking device will be described.

First, the locking mechanism 20 is in an unlocked condition shown in FIG. 2. As previously described, the hook 30 is biased counterclockwise, so that a portion thereof can contact a stopper (not shown) of the lock bases 22. Thus, the hook 30 is maintained in a rotational position shown in FIG. 2. Conversely, the pawl 40 is biased clockwise, so that a distal end portion thereof can contact the outer periphery of the hook 30. Thus, the pawl 40 is maintained in a rotational position shown in FIG. 2.

When the locking operation is performed, the striker 50 relatively enters the recesses 23 of the lock bases 22. Because of the entering of the striker 50, the striker 50 contacts one end portions 31a of the hook recess 31 of the hook 30. As a result, a force can be applied to the hook 30 to rotate the same about an axis of the hook shaft 36. Thus, the hook 30 is rotated clockwise against a biasing force described above, so that the striker 50 can engage the hook recess 31. As a result, the striker 50 can be held between the other end portions 31b of the hook recess 31 and inner portions of the recesses 23.

At the same time, the pawl 40 is rotated by a biasing force described above. As a result, the engagement end surface 42 thereof can engage the contact surface 35a of the elastically reactive portion 35 formed in the resin coating 34, so as to hold the engagement surface 32 of the hook 30 via the elastically reactive portion 35. Thus, the locking mechanism 20 can be maintained in the locked condition shown in FIG. 3.

In the locked condition of the locking mechanism 20 shown in FIG. 3, when the unlocking operation is performed, the release lever 46 is rotated counterclockwise with the pawl 40 via the cable. As a result, the engagement end surface 42 of the pawl 40 is disengaged from the engagement surface 32 of the hook 30, so that the hook 30 is rotated counterclockwise by the biasing force described above. As a result, the hook recess 31 of the hook 30 can be disengaged form the striker 50. Thus, the locking mechanism 20 can be returned to the unlocked condition shown in FIG. 2 again.

Figure 6:
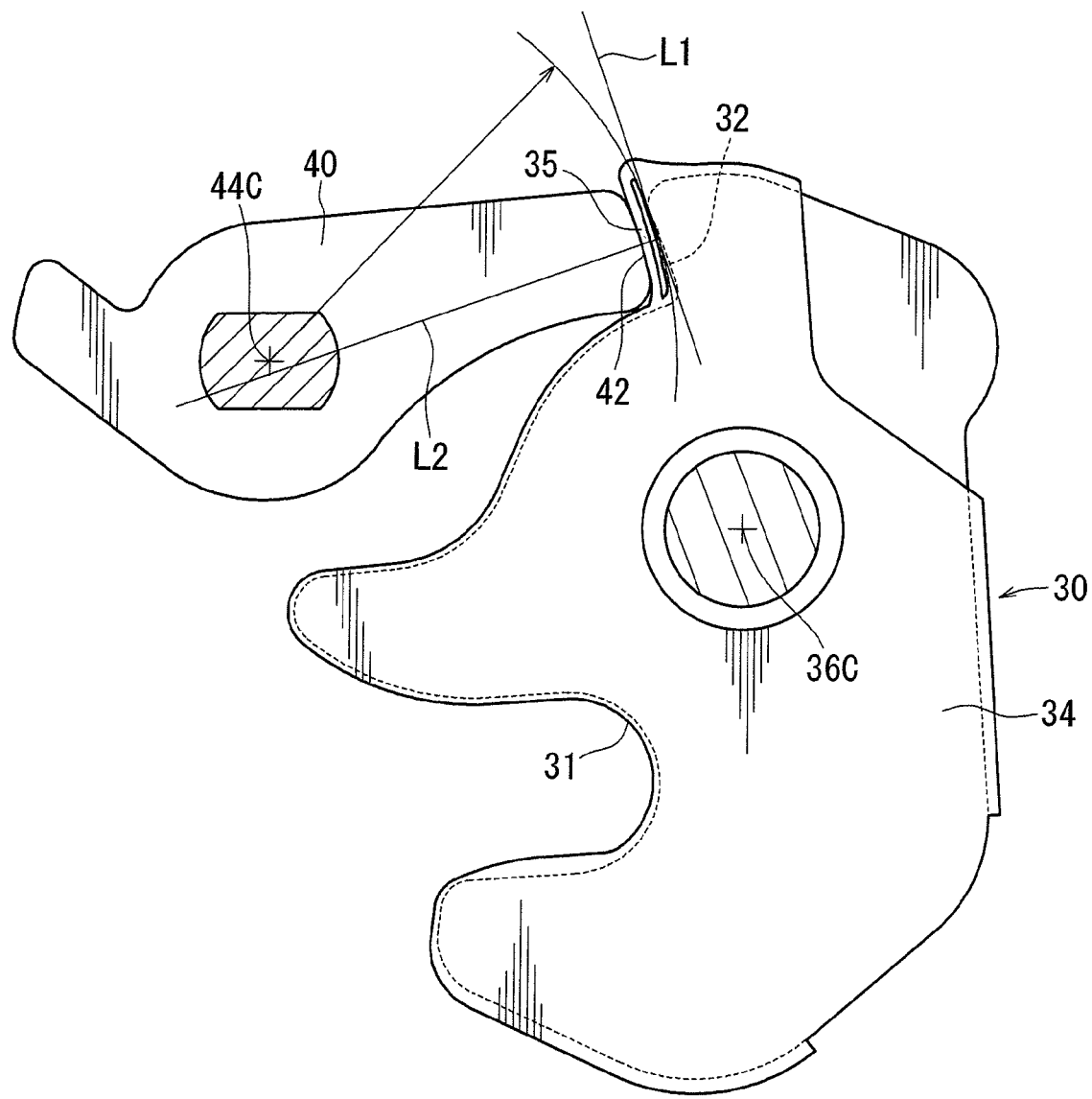
FIG. 6 is a view corresponding to FIG. 4, which illustrate a condition in which a large load is generated to rotate the hook in an unlocking direction.

In the locked condition of the locking mechanism 20, as previously described, the noise generated between the hook 30 and the pawl 40 can be prevented due to the reactive force produced by the deformation of the elastically reactive portion 35. Further, as previously described, the contact surface 35a of the elastically reactive portion 35 includes the oppositely inclined oblique surfaces 35a1 and 35a2 that are formed in both sides of the most projected central portion thereof A function of the oblique surfaces 35a1 and 35a2 will be described. In an initial stage in which the engagement end surface 42 of the pawl 40 starts to engage the contact surface 35a of the elastically reactive portion 35, the engagement end surface 42 can smoothly move in an engaging direction with the aid of the oblique surface 35a1. Further, in a stage in which the engagement end surface 42 clears the central portion of the contact surface 35a, the engagement end surface 42 can be guided in the engaging direction via the oblique surface 35a2. Thus, engagement between the engagement end surface 42 and the contact surface 35a can be maintained. As a result, the engagement end surface 42 of the pawl 40 can reliably engage the contact surface 35a of the elastically reactive portion 35, so that an engagement force therebetween can be increased As shown in FIG. 6, when a large load to rotate the hook 30 in an unlocking direction is generated, the elastically reactive portion 35 can be collapsed by the large load, so that the engagement surface 32 of the hook 30 can substantially be held by the engagement end surface 42 of the pawl 40. As previously described, the engagement surface 32 is formed as the undercut inclined surface and is inclined in such a direction in which the engagement surface 32 is capable of catching the engagement end surface 42 of the pawl 40 when the engagement surface 32 is held by the engagement end surface 42.

As shown in FIG. 6, inclination of the engagement surface 32 is defined as a tangent line L1 to an arc that is centered on an axis 44C of the pawl shaft 44 and passes through a contact point of the engagement surface 32 and the engagement end surface 42. Therefore, when a normal line of the arc at the contact point is positioned between an axis 36C and the axis 44C of the pawl shaft 44, the engagement surface 32 (the tangent line L) can be inclined in such a direction in which the engagement surface 32 is capable of catching the engagement end surface 42. Due to the inclination of the engagement surface 32, the engagement force between the engagement surface 32 and the engagement end surface 42 of the pawl 40 can be increased even though the elastically reactive portion 35 is interleaved therebetween. As a result, even if the large load is applied to the hook 30 in the locked condition so as to rotate the same in the unlocking direction, the engagement end surface 42 of the pawl 40 cannot be disengaged from the engagement surface 32 of the hook 30, so that a locking strength of the locking mechanism 20 can be increased.

Generally, a positional variation between the locking mechanism 20 and the striker 50 can be generated depending on an assembling tolerance thereof or other such factors. However, the lock bases 22 applied with a biasing force described above can rotate about the axis of the support shaft 27 within a limited range that is defined by the notches 28 and the stopper pin 11. Therefore, the striker 50 can be received in the recesses 23 regardless of such a positional variation. That is, the positional variation described above can be absorbed, so that locking performance of the locking mechanism 20 can be maintained.

The invention claimed is:

1. A locking device, comprising:
a locking mechanism provided on one of two members to be engaged with each other; and
a striker provided on the other of the two members,
wherein the locking mechanism comprises:
   a lock base;
   a hook; and
   a pawl,
wherein the lock base has a recess that is capable of receiving the striker,
wherein the hook is rotatably supported on the lock base via a shaft,
wherein the hook, when rotated, is capable of forming a locked condition in which the striker is held between the hook and the recess of the lock base or an unlocked condition in which the hook is spaced from the striker,
   wherein the pawl is rotatably supported on the lock base via a shaft,
   wherein the pawl is capable of rotating to a position in which the pawl can engage an engagement surface of the hook and maintaining the hook in the locked condition, and
   wherein the engagement surface of the hook is provided with a resin coating that constitutes an elastically reactive portion, the elastically reactive portion having oppositely inclined oblique surfaces projecting from the engagement surface and forming a central contact portion capable of contacting the pawl to produce an elastically reactive force between the engagement surface of the hook and the pawl, in the locked condition.

2. The locking device as defined in claim 1, wherein the engagement surface of the hook is inclined in a direction in which the engagement surface is capable of catching the pawl in the locked condition.

3. The locking device as defined in claim 1, wherein the resin coating that constitutes the elastically reactive portion of the engagement surface of the hook covers a portion of the hook in which the striker is held between the resin coating and the recess of the lock base.

4. The locking device as defined in claim 1, wherein in the locked condition, the hook and the pawl contact each other at a peripheral engagement surface to increase the engagement force between the hook and the pawl.

5. The locking device according to claim 2, wherein the resin coating that constitutes the elastically reactive portion in the engagement surface of the hook covers a portion of the hook in which the striker is held between the resin coating and the recess of the lock base.

6. The locking device according to claim 1, the elastically reactive portion comprising a contact surface that is angled, with respect to the engagement surface of the hook such that the central contact portion is most forwardly projected from the engagement surface.

7. The locking device according to claim 1, the elastic reactive surface being deformable upon contact with the engagement surface of the pawl.

8. The locking device according to claim 1, further comprising recessed portions provided in each side of the elastically reactive surface to define a rib portion between the elastically reactive portion and the engagement surface of the hook.

9. The locking device according to claim 1, wherein, in the locked condition, the hook and pawl are in contact at two spaced surfaces.

* * * * *